F. H. RICHARDS.
ART OF MAKING TYPES AND TYPE BARS.
APPLICATION FILED DEC. 4, 1900.

919,216.

Patented Apr. 20, 1909.

Witnesses.
E. A. Jarvis

Inventor.
F. H. Richards.

F. H. RICHARDS.
ART OF MAKING TYPES AND TYPE BARS.
APPLICATION FILED DEC. 4, 1900.

919,216.

Patented Apr. 20, 1909.

F. H. RICHARDS.
ART OF MAKING TYPES AND TYPE BARS.
APPLICATION FILED DEC. 4, 1900.

919,216.

Patented Apr. 20, 1909.
4 SHEETS—SHEET 3.

Witnesses
C. A. Jarvis.

Inventor.
F. H. Richards.

F. H. RICHARDS.
ART OF MAKING TYPES AND TYPE BARS.
APPLICATION FILED DEC. 4, 1900.

919,216.

Patented Apr. 20, 1909.
4 SHEETS—SHEET 4.

Witnesses
C. A. Jarvis
E. Champion

Inventor.
F. H. Richards,

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

ART OF MAKING TYPES AND TYPE-BARS.

No. 919,216.          Specification of Letters Patent.          Patented April 20, 1909.

Application filed December 4, 1900. Serial No. 38,614.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Types and Type-Bars, of which the following is a specification.

This invention relates to the art of making types and typebars, and especially to a method of making from a solid blank or bar of metal a typebar adapted for use in the typographic art for printing a line of characters.

The present invention is in the nature of an improvement upon that shown, described, and claimed in the application of Darien W. Dodson, Serial No. 600,152, filed July 22, 1896, to which I have permission to refer. In the Dodson process the separate types are formed on the edge of a typebar-blank by first removing excess material from the edge of a typebar-blank to set off a solid typeblank and then subjecting the face of this blank to the compressing action of a typedie to form a type. In this Dodson process the removal of the excess material is effected usually by slotting the edge of the typebar-blank at two separated points to set off between the slots a solid type-blank, and the die preferably operates upon the latter with a rolling movement in order to form the type. This rolling movement, however, in the Dodson process, is a simple one, it being a progressive cycloidal movement in a proper orbit.

The present process, as before stated, is in the nature of an improvement upon that of Dodson, and, broadly speaking, the same result is attained by both—viz., the formation of adjacent types in a solid blank by removing excess material not required for the making of said types; but the present process differs in many respects from that of Dodson and is a distinct advance in the art, especially in point of simplicity of operation and when the quality of the product resulting therefrom is considered.

My present invention is also in the nature of a companion process to the processes shown, described, and claimed in my applications Serial Nos. 740,512, filed December 16, 1899, and 740,673, filed December 18, 1899, in which applications there are disclosed two species of processes for forming a type upon a typebar-blank without previously setting off a type-blank; that is to say, in my said prior applications I have illustrated two specific methods of forming a type upon the edge of a typebar-blank without first reducing or removing material in advance of the metal from which such type is to be formed. Two of the principal features which distinguish my said companion processes from that of Dodson are these: I avoid the necessity of setting off a finished type-blank before the die is brought into action, and I subject each type-formative portion of the blank to repeated rolling operations, preferably of such a character that not only will the face of the type be perfectly finished but the base portion will also be finished and strengthened to such an extent as to enable it to resist greater crushing forces and last longer.

My present invention is a method of making types and especially typebars which differs generically from the Dodson process and from each of the processes shown in my said companion applications, in that in my said companion applications the process of forming a space in advance of each type is not independent of, but is dependent upon, the process of forming such type, whereas in the present case not only is the invention distinguishable from the Dodson process by reason of the fact that the space in advance of each type is not formed prior to such type, but it is also distinguishable from the processes described in my said companion applications by reason of the fact that the operation of forming the space is entirely independent of the operation of forming the type preceding such space. In my said companion applications the process of forming the space in advance of a type is dependent upon the process of forming such type for the reason that in such case the space is formed by a wall of the die which forms the type, whereas in the present case the process of forming a space in advance of the type is not dependent upon the process of forming such type for the reason that the space and the type are formed by separate and independent members, the type being formed in this case by rolling a die in contact with the edge of the blank, and the space being formed by reciprocating a planing tool back and forth across the edge of such blank.

In forming a type on a typebar-blank in accordance with my present process I compress a portion of the blank in contact with a type-die while such portion is supported at its forward side, and in making a space in advance of such type I remove material, from that portion of the typebar-blank which is in advance of such type, not earlier than the beginning of the type-forming operation, and preferably synchronously with such operation, this being one species of the process of forming a type and a space in advance of such type independently without first forming the space, another species of such process being shown, described, and claimed in my companion application Serial No. 40,574, filed December 20, 1900, which covers the process of forming a type and a space in advance of such type independently and successively, the space after the completion of the type. The formation of a space in advance of each type is not only accomplished by an operation independent of that for making the type, but by one which need not be at all analogous thereto. This is the case with the present invention in which each type is formed by rolling the edge of the typebar-blank while the space in advance thereof is formed by gradually cutting or planing away the stock, this latter operation, of course, serving merely to remove material from the blank and exerting no compressing or condensing action thereon. In carrying out the present process the removal of material in advance of a type begins not earlier than the beginning of the operation of forming such type and preferably is synchronous therewith; that is to say, in the process which constitutes the subject-matter of this invention the type-forming and space-forming operations while entirely independent of each other begin and end at the same time, and thus the material in advance of the forming type, and which serves as a means for resisting the type-forming action and supporting the type at its forward side, is removed at substantially the same rate as the type-formative material is compressed, and hence the space-forming operation proceeds at substantially the same rate as the type-forming operation. When the operation of forming such a space is carried on in this manner it will be evident that there will be resistant material at the forward side of the forming type during the whole of the type-forming operation, and that the material in the type-field and the material in the space-field are connected by a substantially horizontally-disposed mass of stock throughout the whole period during which the blank is gradually rolled to form a type. That improvement in the art of forming typebars in which the type and the space are formed by independent operations, but in which the space is not begun until the type in the rear thereof is completely finished, is not set forth herein but constitutes the subject-matter of my companion application Serial No. 40,574, filed December 20, 1900.

In the drawings accompanying this specification and forming part of the present application.

Similar characters designate like parts in the different figures of the drawings.

Figure 9:
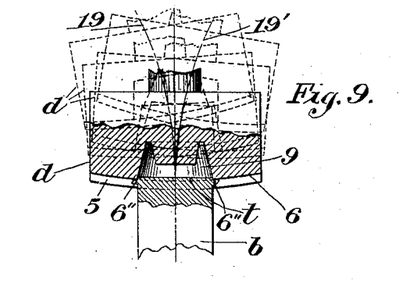
Figs. 9, 11, 13, 15, 17, and 19 are sectional end elevations of a portion of a die and a type-bar blank enlarged to about ten times the natural size, and illustrate successive steps in the operation of forming a type by repeated rollings.
Figure 10:
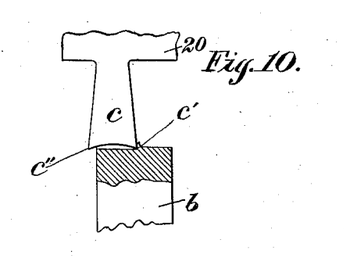
Figs. 10, 12, 14, 16, 18, and 20 are similar views illustrating on the same scale and at corresponding points in the operation the formation of a space, the space-forming tool being shown in elevation and the blank in sectional elevation.
Figure 11:
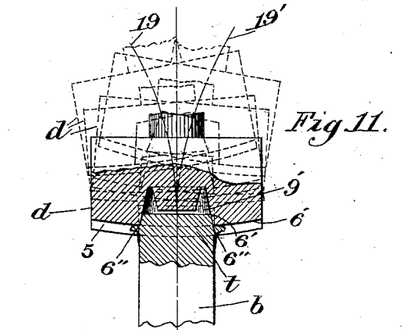
Figure 12:
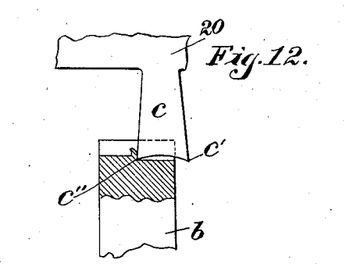
Figure 13:
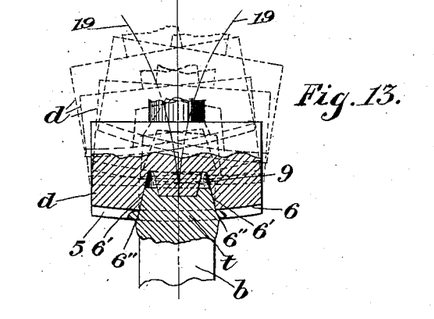
Figure 14:
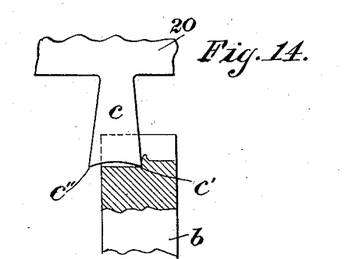
Figure 15:
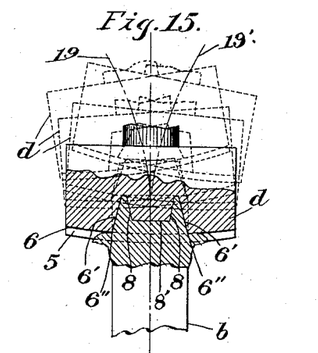
Figure 16:
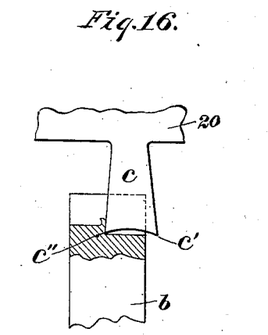
Figure 17:
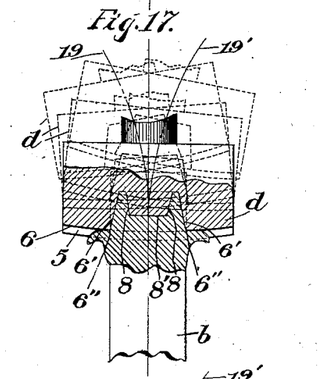
Figure 18:
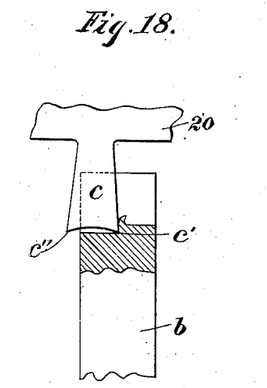
Figure 19:
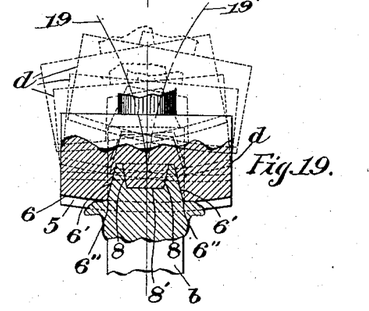
Figure 20:
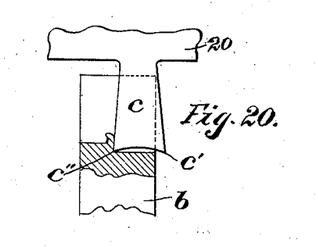

The blank may be subjected to the necessary repeated operations in any suitable manner, but while hand-operated tools may be employed for the purpose suitable mechanism will ordinarily be used. Moreover, while different tools may be employed for operating upon each separate face of a type-block or type-blank I have deemed it preferable to make use of a single tool or die, as when one of these two coöperating members is moved properly relatively to the other a single die is sufficient to subject the type-blank to all of the various operations which it undergoes before becoming a finished type. This type-die, however, is so constructed in the present case as to be capable of forming only a type, and each space in advance of a type is intended to be formed by a separate and independently operating member. Any proper type-die may be employed for the purpose of forming a type, and this may be mounted in any desired manner, though I prefer to support one or more type-dies, such as d, on a carrier, such as D, which carrier may be secured to a shaft, such as 2, having a movement of revolution about another axis and also a movement of rotation about its own axis, the resultant movement of each die when its carrier is rotating and revolving being, of course, a cycloidal one, as indicated in Figs. 9, 11, etc.

The blank, which may be of any material suitable for the purpose, but will usually be a type-metal of proper composition, is designated by b, and may be supported by and be movable with a carrier, such as B', mounted on a fixed carrier, such as B, and movable thereon toward and from the type-forming die which coöperates therewith. In this case the movable carrier B' has a bore therein, in which is seated a spring, such as 3, which at its upper end is in contact with a face of the fixed carrier B and tends to force the movable carrier B' downward, while suitable operating means, such as an angle-lever 15, on a rock-shaft 15', and carrying at its end an antifriction-roll 15", may be employed for the purpose of raising the movable carrier B' on the carrier B by which it is guided in its vertical movements.

The entire operation of forming a type is carried out in this case by operating a die in contact with the typebar-blank and feeding said blank toward the die, and the die employed is so constructed that it forms a type but does not form a space in advance of such type. A die of this construction while operating as a single mechanical part, and while it is actually constructed in one piece, has many functions that may be carried out by a large number of tools each having a single function; that is to say, it not only serves to shear out a type-block to fill the die-space, but it also rolls the face of the type-block, swages the face of the type to form, and forges the end walls of the type.

The type-dies shown herein have only one blade each, as distinguished from the dies shown in my companion applications Serial Nos. 740,512 and 740,673 hereinbefore referred to, this blade being at the rear side of the die and being preferably of the structure shown at 5. This blade is somewhat thin and is preferably considerably thinner than the tool which serves to form the space in advance of each type. Said blade forms a means for confining endwise of the bar flowage of the stock toward the rear side of the die, the solid body of metal in the blank in advance of the die that is being operated serving to confine endwise flowage at the forward side of the die, although, of course, during compression surplus stock will be free to flow out crosswise of the bar. The blade 5 will preferably project throughout its whole length beyond the outer or bottom wall 6 of the type-die, and hence throughout the whole period during which a type is being formed said blade serves to confine at that side of the die the mass of material that is being shaped. The bottom 6 of the die serves to roll out sidewise the major portion of the material not required for the making of a type. The end walls of the die-space, which are indicated herein by 6', intersect the bottom 6 in the usual way, as at 6", and the edges 6" serve to shear or cut away from the mass of the bar a type-block or type-blank containing sufficient material to fill the die-space and to form a finished type; and that part of the edge of the type-bar-blank which is operated upon, but is not compressed by the blade 5, and is not contained within the die-space, is compressed by the bottom wall 6 of the die and is rolled off sidewise of the typebar-blank when the die-carrier D is rolled back and forth transversely to the typebar-blank, but the material so rolled off is always confined endwise of the bar between the blade 5 and that portion of the stock contained in the typebar-blank immediately in advance of and below the outer forward wall 6''' of the die. Hence none of this surplus material is operated on in such a manner as to force it into the field of an adjacent type or space, but instead all of the excess, whether it is forced out by the edge of the blade 5 or by the bottom wall 6 of the die, flows sidewise of the blank and may be severed from the bar to bring the sides of the latter into parallelism with each other.

The manner in which and the extent to which the type-formative material confined between the blade 5 and the stock in advance of the forward wall 6''' is operated upon are dependent upon the rolling movement of the die and also upon the feed movement of the blank. In this case the latter is fed step by step toward the die in a regular manner as the die travels back and forth across the edge of the blank, and hence during the rolling movement of the die the type-forming action will be carried down into the stock through successive and substantially equal distances, although, of course, it will be understood that the effect of the rolling action upon the blank will not be the same for each operation of the die.

As in my companion applications hereinbefore mentioned the stock is subjected to a series of operations by means of which a type may be formed without impairing the strength of the type-formative material of the typebar-blank. It has been stated before that these blanks will be a suitable composition of type-metal, and moreover they may be in the form of separate typebar-blanks or a continuous strip or ribbon of metal from which the typebars may be severed after being completed. In every case, however, wrought-metal blanks formed ordinarily by the usual rolling operations should be employed, as I have found in practice that cast-metal blanks are undesirable for the purpose and are not so well adapted to be wrought into shape by such operations as are employed in this process. The principal reason for this is that cast-metal when rolled and forged in this manner tends to crush and crumble beneath the die instead of compressing and flowing properly, and hence the cast metal will not fill the dies so well as the wrought metal nor form the smooth faces and sharp edges that the latter will.

The best results that I have been able to obtain in the manufacture of typebars from cold metal have been secured by subjecting wrought-metal blanks to such operations as will tend to preserve, instead of impair, the strength of the material. The operations by which this result is obtained are those by which wrought metal is ususally formed or to which wrought metal is ordinarily subjected—that is, rolling, swaging, forging, etc.—and by means of these operations types are wrought into form on the edge of a typebar blank according to my improved process.

While, in the preferred mode of practicing my invention, a single die may be employed for performing all of the operations to which the cold-metal blank is to be subjected, yet it should be understood that the several operations to which it is necessary to subject a solid blank in order to form a wrought-metal type may be carried out in any suitable manner so long as the desired result is obtained. Here, however, the swaging of the face of the type will be performed by the face or inner wall of the die; the rolling will be accomplished chiefly by the base or outer wall of the die and by the edge of the die-blade; and the forging of the type-body will be effected principally by means of the end walls of the die, which will usually be considerably inclined in order that the type may be shaped properly and sufficient room left between such walls and the corresponding sides of the type to assure the filling of the die-space during the final stages of the type-making operation.

The manner in which a type is shaped when the blank is subjected to the action of a rolling die during the feeding of the blank toward the die is somewhat complex but is clearly illustrated in Figs. 9, 11, 13, 15, 17, and 19, which illustrate the appearance of the forming type during certain stages of the operation. As the die is swung toward the right and toward the left alternately and the blank is fed toward the die either during or after the type-forming action, as may be desired, the stock at the base of the type-blank or type-block $t$ is forged first at the left-hand side and then at the right-hand side, as seen in Figs. 9, 11, etc., the forging action being, of course, the greatest near the base of the type-block and also being greater as the forging action is carried farther and farther down into the stock. This forging action, however, extends up the entire length of the side being operated upon and results in a thorough compacting or condensing of the particles of the blank. The forging action being greatest at the base of the type-blank the latter will be strengthened most in the region of its base, but the strengthened base will also be connected with the face of the type by a thick layer of condensed metal thoroughly compacted by the forging operation. At the same time that this metal is compressed by the forging action of the end walls 6' of the die-space the central upper portion of the type-blank is forced upward into the die owing to the resistance opposed to the forging action by the upper walls 8 and 8' of said die-space. At each movement of the die toward one of its extreme positions the metal so forced up tends to fill one side of the space 9, while the opposite side of said space forms an outlet through which the air confined between the type-blank and the die may escape. As the operation continues, and the die is rolled first to one side and then to the other, following the two branches 19 and 19' of the cycloid toward and from their cusp of intersection, the opposite ends of the type-block, especially near the base thereof, are more and more condensed by the forging operation and the upper portion or head of the type-block is forced up farther and farther until the metal completely fills the die-space. During these two movements—viz., the rolling of the die and the feeding of the blank toward the die—the cutting edges 6" of the die shear farther and farther into the metal of the typebar-blank and gradually complete the cutting out of the type-block or type-blank from the mass of the metal. This type-blank, it will be seen, is not completely sheared from the typebar-blank until the actual completion of the making of the type. In other words, the shearing of the type-blank and the formation of a type from that type-blank are substantially coincident in the present application as in my companion applications hereinbefore mentioned. Each time that a feed movement of the blank and a rolling movement of the die occur an additional portion of the surplus material confined between the die-blade 5 and the mass of metal in advance of the outer forward wall of the die is forced out sidewise of the blank principally by the bottom wall 6. After such portion of the surplus has been forced out sidewise in this manner the cutting edges 6" at the next operation shear farther into the body of the blank and the metal at the point at which such cutting edge previously operated is forced farther out toward or beyond the side of the bar.

Figs. 9, 11, 13, 15, 17, and 19 illustrate, respectively, the first, four intermediate, and the final rolling operations, the positions of the die as it moves toward and away from the blank along the cycloidal curves 19 and 19' being shown in each of these figures in dotted lines, and its central working position being shown in each case in full lines. Of course, when the die and the blank are separated they should withdraw from one another in such a manner as not to impair the finished type, and this result is preferably accomplished in the present case by simply dropping the blank b and the blank-holder B'.

As before stated, the space in advance of each individual type which should separate it from the next succeeding type may be formed in any suitable manner, not earlier, however, then the beginning of the typeforming operation. In this particular process said space is formed simultaneously with the type, as will be evident by referring to Figs. 10, 12, 14, 16, 18, and 20, and hence the stock contained in the space-field, which is the space occupied by the material upon which the space-forming tool operates, is removed at substantially the same rate that the material in the type-field is rolled, swaged, and forged, and the support which it is necessary to preserve at the forward side of and below the forming type for the purpose of preventing imperfect location of such type is not at all impaired when the space-forming operation is carried on in this manner. In this case I have shown a double-edged cutter c, which is carried by a cutter-bar or cutter-carrier 20, and may be pivoted to an angle-lever 21, carried by or secured to a suitable shaft or stud 22, and operated in any suitable manner, as by means of a connecting-rod 23. The cutter c preferably has two cutting edges c'. and c'' in order that it may plane the stock in both directions as it is reciprocated back and forth in contact with the blank. Said cutter will also preferably taper toward the cutting edges c' and c'', one side thereof being intended to work in the plane of the extreme, outer, forward wall of the die d, while the other side of said cutter is, as shown at c''', an oblique face and is intended to be a cutting edge which will shave the blank to form a space s having the forward wall thereof inclined forward toward the upper edge of the blank, as shown at s'. At each semi-reciprocation of the cutter one or the other of its cutting edges c' and c'' will remove a portion of the horizontal surface of the blank, while the cutting edge c''' will remove a portion of the oblique wall s', and when the type is completely finished the space s should also be at its full depth, a horizontal, resistant, type-supporting connection being maintained throughout this operation between the type-formative material and the space-formative material. Moreover by removing material from the space-field in the manner just described not only is this supporting connection between the type and the stock in advance thereof maintained, but the space material is removed gradually and there is no disturbance of, or interference with, the material contained in the forming type immediately in the rear of such space.

It will be noticed that the space formed by the cutter c is considerably wider than the space which finally separates two adjacent completed types. The reason for this is that during the formation of the next succeeding type after the completion of a space in the rear thereof the stock which forms such type is not only forced downward but is also forced backward, is tipped over or flows on to the bottom wall $s''$ of the space formed by the cutter, partially fills up such space, and also carries down the line $s''$ to substantially the position indicated by the broken lines $s'''$, the result being that the types and spaces overlap upon the edge of the finished typebar, all of which is more particularly set forth in my companion application Serial No. 40,574, filed December 20, 1900.

Figure 8:
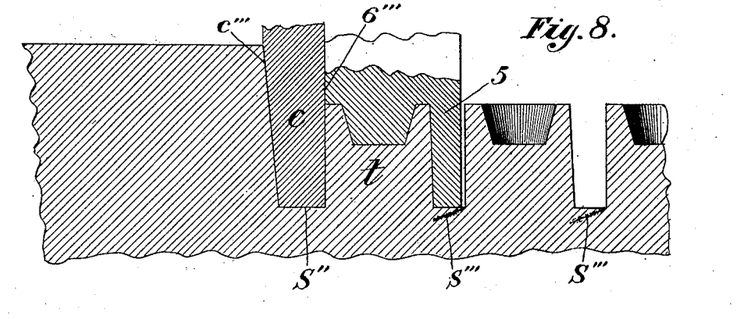

After one type has been formed on the typebar-blank another may be shaped in substantially the same way, as is clearly shown in Fig. 8, but in every case the blade 5 should be so located as to lie close to the side of the preceding, finished type, in order that the types when finished may be sufficiently close to one another.

The fins $f$ and $f'$, which are rolled off from the sides of the bar by the conjoint action of the bottom wall of the die and the edge of the blade 5, may be removed at any proper time and in any suitable manner, a pair of cutting tools, such as C, being shown herein for this purpose, these preferably operating after a series of types has been formed.

Figure 1:
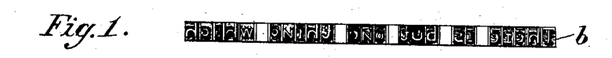
Figures 1 and 2 are, respectively, a plan and a side elevation of a typebar made by my improved process and enlarged about two-thirds.
Figure 2:
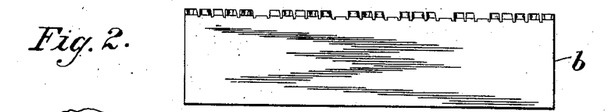
Figures 3, 4:
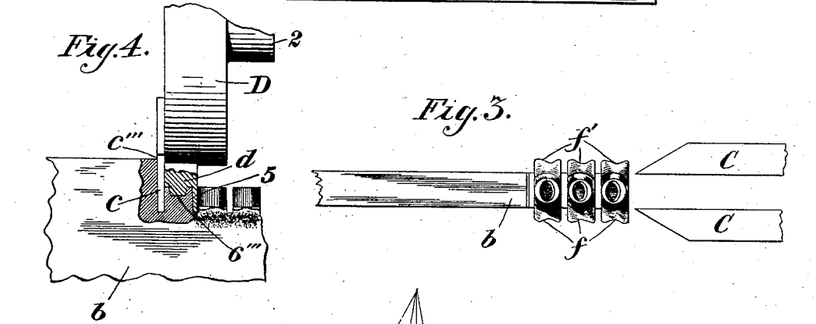
Fig. 3 is a plan of a portion of a partially-finished bar enlarged to about five times the natural size, and illustrates the appearance of the finished and partially-finished types and spaces on the edge of a typebar-blank.
Fig. 4 is a side elevation of the same illustrating in section the operation of a die and a space-forming tool for forming, respectively, a type and a space.
Figure 5:
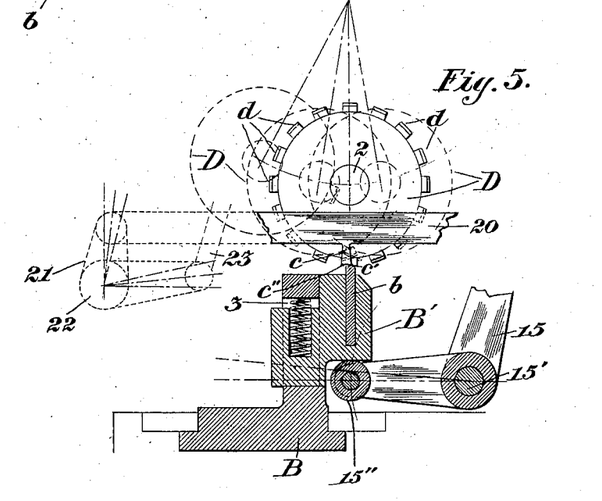
Fig. 5 is a sectional elevation illustrating a die-wheel, a space-forming tool, and blank-feeding means coöperating with a typebar-blank, the parts being shown on the same scale as in Figs. 1 and 2.
Figure 6:
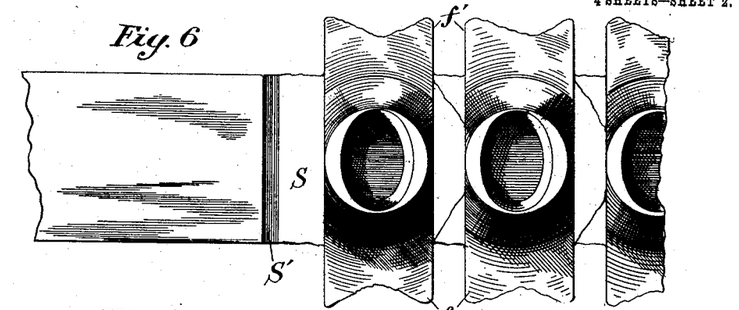
Figs. 6, 7, and 8 are, respectively, a plan, a side elevation, and a central longitudinal section of a portion of a partially-finished bar enlarged to about twenty times the natural size, and illustrates in detail the manner in which the respective types and spaces are formed and the effects produced by the compression and dislodgment of material in forming the type.
Figure 7:
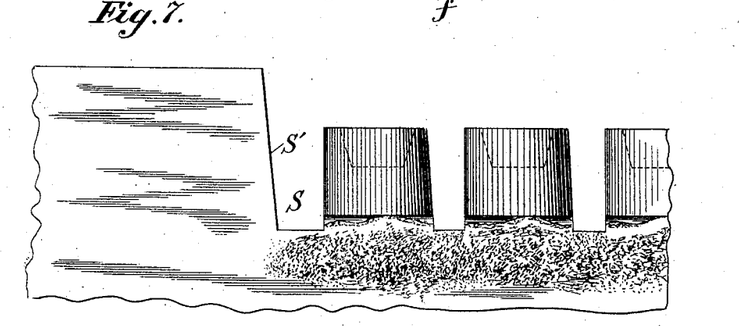

The spaces between groups of letters or words may be formed in any suitable way, but preferably by means of blank dies which will roll the metal off in substantially the manner just described and as shown in Figs. 1 and 2. These blank spaces may be of any suitable widths, and, of course, the letters themselves will be of varying widths, but in all cases it is desirable to form between the words spaces of such widths as to make typebars of uniform lengths, whether the blank spaces be of the same width or of varying widths, thus assuring the formation of typebars having the types thereon properly spaced.

Having described my invention, I claim—

1. That improvement in the art of making a typebar which consists in two steps synchronously but independently performed upon a blank namely; compressing in contact with a type die a portion of the edge of a typebar blank while such portion is supported at its forward side by adjoining stock and thereby forming a type, and forming a space adjoining said type and in advance thereof.

2. That improvement in the art of making a typebar, which consists in imparting to one of the following two members—viz., a typebar-blank and a type-die—a curvilinear movement while said die is in contact with a portion of the edge of such typebar-blank and thereby forming a type while the forming type is supported at its forward side by adjoining stock, and independently forming a space adjoining said type and in advance thereof.

3. That improvement in the art of making a typebar, which consists in imparting to one of the following two members—viz., a typebar-blank and a type-die—a reciprocatory movement in a curvilinear path while in contact with the other and thereby forming a type, and independently forming a space adjoining said type and in advance thereof.

4. That improvement in the art of making a typebar, which consists in rolling a portion of the edge of a typebar-blank while in contact with a type-die and thereby forming a type while the forming type is supported at its forward side by adjoining stock, and independently forming a space adjoining said type and in advance thereof.

5. That improvement in the art of making a typebar, which consists in rolling a portion of the edge of a typebar-blank in opposite directions alternately while in contact with a type-die and thereby forming a type while the forming type is supported at its forward side by adjoining stock, and independently forming a space adjoining said type and in advance thereof.

6. That improvement in the art of making a typebar, which consists in compressing in contact with a type-die a portion of the edge of a typebar-blank while such portion is supported at its forward side by adjoining stock and forcing surplus material beyond the sides of the blank and thereby forming a type; independently forming a space adjoining said type and in advance thereof; and separating the aforesaid surplus material from the blank.

7. That improvement in the art of making a typebar, which consists in compressing in contact with a type-die a portion of the edge of a typebar-blank while such portion is supported at its forward side by adjoining stock and thereby forming a type; independently forming a space adjoining said type and in advance thereof; and feeding one of said two coöperative members toward the other during the formation of the type.

8. That improvement in the art of making a typebar, which consists in compressing in contact with a type-die a portion of the edge of a typebar blank while such portion is supported at its forward side by adjoining stock and thereby forming a type, and independently removing metal from the bar and thereby forming in advance of said type a space having its rear wall substantially in the plane of the extreme outer wall of said type.

9. That improvement in the art of making a typebar, which consists in gradually compressing in contact with a type-die a portion of the edge of a typebar-blank while such portion is supported at its forward side by adjoining stock and thereby forming a type, and independently and gradually forming a space in advance of said type during the formation of the latter.

10. That improvement in the art of making lines of type, which consists in subjecting a blank to a series of successive gradual reductions to form the characters thereon, and also to independent successive series of gradual reductions to form spaces between such characters.

11. That improvement in the art of making a type, which consists in reciprocating a die across the edge of a blank and independently making a space at the side of the forming type concurrently with the shaping thereof.

12. That improvement in the art of making a type, which consists in reciprocating a die across the edge of a blank, in independently making a space at the side of the forming type concurrently with the shaping thereof and in feeding the die and the blank together during such shaping operation.

13. That improvement in the art of making a line of type which consists in subjecting a blank to a succession of gradual displacements to form the characters, and also simultaneously with such gradual displacement, but independently thereof, to form spaces between such characters.

14. That improvement in the art of making a line of type which consists in subjecting a blank to successive gradual displacements of the material thereof, whereby to form a series of types in succession, and to a series of gradual reductions of certain other portions of the blank, whereby to form spaces between such types.

15. That improvement in the art of making a line of type, which consists in subjecting a blank to a succession of gradual reductions to form a succession of types and to a succession of independent gradual reductions to form simultaneously with the making of each type a space at the side thereof.

16. That improvement in the art of making a line of type which consists in forming impressions upon a blank by a succession of gradual reductions to make each of a succession of types and successively scoring said blank at the side of each type to create a space.

17. That improvement in the art of making a line of spaced type upon a blank which consists in effecting a succession of gradual reductions of the blank in producing each impression and effecting a concurrent succession of gradual reductions of the blank in producing each space.

18. That improvement in making a line of spaced type upon a blank which consists in forming each type by a succession of reductions by the working engagement with a die with the blank and effecting a succession of space forming reductions by removal of metal from the blank.

19. That improvement in the art of making a typebar which consists in two steps namely; compressing in contact with a type die a portion of the edge of a typebar blank while such portion is supported at its forward side by adjoining stock and thereby forming a type, and independently thereof and at or after the beginning of the type forming step forming a space adjoining said type and in advance thereof.

FRANCIS H. RICHARDS.

Witnesses:
FRED. J. DOLE,
C. E. VOSS.